United States Patent
Carson et al.

(10) Patent No.: US 8,244,061 B1
(45) Date of Patent: Aug. 14, 2012

(54) AUTOMATED DETECTION OF SOURCE-BASED ARTIFACTS IN AN INFORMATION SIGNAL

(75) Inventors: Eric M Carson, Cushing, OK (US); Xinjie Yu, Stillwater, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 0 days.

(21) Appl. No.: 13/309,988

(22) Filed: Dec. 2, 2011

Related U.S. Application Data (60) Provisional application No. 61/545,456, filed on Oct. 10, 2011.

(51) Int. Cl.
*G06K 9/00* (2006.01)
*G06K 9/40* (2006.01)
*H04N 9/64* (2006.01)

(52) U.S. Cl. ......... 382/275; 382/167; 382/274; 348/251

(58) Field of Classification Search .................. 382/163, 382/166, 167, 274, 275; 348/241, 251
See application file for complete search history.

(56) References Cited

U.S. PATENT DOCUMENTS

| | | | | |
|---|---|---|---|---|
| 4,628,369 A * | 12/1986 | Ichinoi et al. | ................. | 386/270 |
| 5,034,823 A * | 7/1991 | Geerlings | ................. | 386/271 |
| 5,243,664 A | 9/1993 | Tuy | | |
| 6,122,393 A | 9/2000 | Schweid et al. | | |
| 6,252,680 B1 | 6/2001 | Schweid et al. | | |
| 6,310,660 B1 * | 10/2001 | Abuali et al. | ................. | 348/616 |
| 6,490,008 B1 | 12/2002 | Harrington | | |
| 7,173,971 B2 | 2/2007 | Amara et al. | | |
| 7,643,088 B2 | 1/2010 | Silverstein et al. | | |
| 2002/0131647 A1 * | 9/2002 | Matthews | ................. | 382/268 |
| 2002/0181762 A1 * | 12/2002 | Silber | ................. | 382/154 |
| 2004/0175139 A1 * | 9/2004 | Tsumagari et al. | ................. | 386/95 |
| 2005/0174900 A1 * | 8/2005 | Kim et al. | ................. | 369/44.32 |
| 2006/0210191 A1 * | 9/2006 | Silverstein | ................. | 382/275 |
| 2006/0274210 A1 * | 12/2006 | Kim | ................. | 348/624 |
| 2007/0030900 A1 | 2/2007 | Verdu et al. | | |
| 2007/0250893 A1 * | 10/2007 | Akiyama et al. | ................. | 725/131 |
| 2008/0165851 A1 | 7/2008 | Shi et al. | | |
| 2008/0232765 A1 * | 9/2008 | Patten et al. | ................. | 386/52 |
| 2008/0239557 A1 * | 10/2008 | Gerasimov | ................. | 360/77.08 |
| 2010/0177129 A1 | 7/2010 | Fredlund et al. | | |
| 2011/0001850 A1 * | 1/2011 | Gaubatz et al. | ................. | 348/241 |

* cited by examiner

*Primary Examiner* — Yubin Hung
(74) *Attorney, Agent, or Firm* — Hall Estill Attorneys at Law

(57) ABSTRACT

Method and apparatus for detecting source-based artifacts in a compressed video data set formed by outputting a baseband video data set from a source device and applying a codec algorithm thereto to generate the compressed video data set. In some embodiments, the compressed video data set is decompressed to provide a decoded video data set, and at least one source-based artifact in the decoded video set is detected responsive to a luminance value of at least one pixel in the decoded video data set, the at least one source-based artifact induced by the source prior to the compression encoding of the input video frame and detected independently of the input video frame.

25 Claims, 5 Drawing Sheets

AUTOMATED DETECTION OF SOURCE-BASED ARTIFACTS IN AN INFORMATION SIGNAL

RELATED APPLICATIONS

The present application makes a claim of domestic priority to U.S. Provisional Patent Application No. 61/545,456 filed Oct. 10, 2011.

BACKGROUND

An ongoing trend in the broadcast and production industry is to convert data from a baseband (e.g., analog) format to a file-based digital format. Converting data to digital format provides a number of advantages, such as facilitating the ability to efficiently edit, store, transmit, encode, reproduce and playback the data. During an analog to digital format conversion process, an information signal (e.g., an audio and/or video data set) may be initially read out from an analog storage medium, such as a videotape. Block-based transformation signal processing may be applied to the input information signal using digital coder-decoder circuits ("codecs") to provide a corresponding digitally compressed data set (digital file). One commonly employed video codec carries out data compression in accordance with the well known MPEG (Moving Pictures Expert Group) standards.

The resulting digital data set may be arranged as a sequence of video frames which are displayed at a predetermined rate (e.g., 30 frames per second) during playback on an end user display device (e.g., a television). Commonly employed codecs may generate the individual frames by providing an array of pixels, with each pixel describing a single point of the video frame. Each pixel may be described in terms of both color and light intensity (luma value) using multi-bit digital values. Groups of pixels may be arranged into blocks, groups of blocks may form macroblocks, and groups of macroblocks may compose the entire frame. In this way, the codecs can describe the frame using the smallest unit that changes from one frame to the next, thereby reducing the size of the digital data set.

The digital conversion process can introduce a number of different types of digital artifacts into the digital data set, such as blockiness (noticeable block transitions) and ringing (blurry edges). A number of operable solutions have been proposed in the art to reduce the effects of digital artifacts that are induced by the operation of a codec, such as a downstream digital signal processing circuit that takes the output of the codec and applies averaging or blending techniques to the encoded digital data set.

Another form of artifact that may be present in a digitally encoded data set may be referred to as a source-based (baseband) artifact. Unlike the codec-based artifacts that arise by operation of the codec, baseband artifacts are present in the initial information signal itself prior to codec processing. Baseband artifacts may arise for a number of reasons, such as but not limited to noise, RF signal variations (e.g., drop outs) from the analog readback head, and low RF SNR (signal to noise ratio) characteristics of the recorded data from an analog storage medium (e.g., tape).

Source-based artifacts in a digitally encoded data set can be detected by comparing the decoded playback of a digital data set to the playback of the original source data set on a frame-by-frame basis. Such comparison, however, generally requires the availability of the medium on which the original analog data set is stored (e.g., the source tape), and can be time and resource intensive since the comparison may require playing back the source data at its normal playback rate (e.g., realtime playback).

SUMMARY

Various embodiments of the present invention are generally directed to an apparatus and method for detecting source-based artifacts in a compressed video data set.

In accordance with some embodiments, a compressed video data set is formed by outputting a baseband video data set from a source device and applying a codec algorithm thereto to generate the compressed video data set. The compressed video data set is decompressed to provide a decoded video data set. At least one source-based artifact in the decoded video set is detected responsive to a luminance value of at least one pixel in the decoded video data set. The detected source-based artifact is induced by the source prior to the compression encoding of the input video frame, and is detected without the availability of the input video frame.

Various features and advantages of embodiments of the present invention can be understood by a review of the following detailed description and the accompanying drawings.

DETAILED DESCRIPTION

Figure 1:
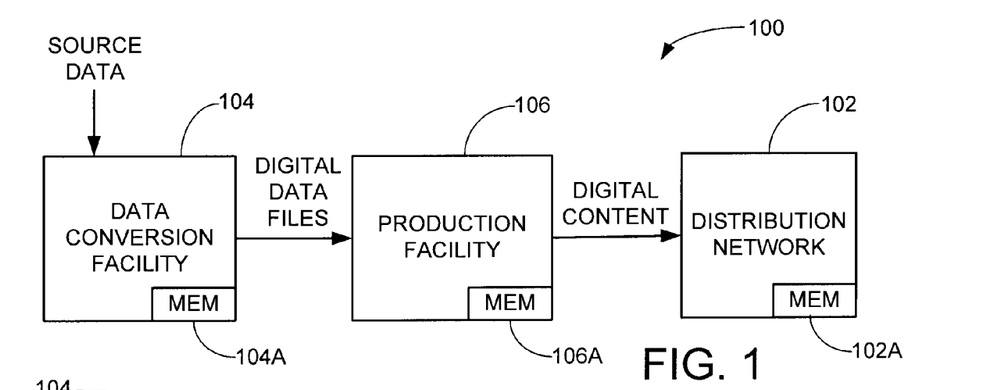
FIG. 1 is a functional block diagram of a data handling system constructed and operated in accordance with various embodiments of the present invention.

FIG. 1 provides a top level diagram for a data handling system 100. The data handling system is provided to show an exemplary embodiment in which various embodiments of the present disclosure can be employed. It will be appreciated that many other applications can employ the subject matter set forth herein, so those aspects depicted in FIG. 1 are merely for purposes of illustration and are not limiting.

The system 100 is characterized as a digital data distribution system in which digital content is broadcast or otherwise delivered to one or more end users through a distribution network 102. The content is processed by a data conversion facility 104 which operates to convert initial source data (e.g., analog data on an archive tape, film or other medium) into the form of one or more digital data files (data sets).

The data sets are provided to a production facility 106 which processes the data sets to provide the digital content. The distribution network 102 may constitute a broadcast system that sends the content via cable television, airwave broadcast, Internet delivery, or some other delivery mechanism to the end user(s).

At this point it will be appreciated that the various embodiments discussed herein are not limited to network broadcasting, but can be utilized in any number of environments, including but not limited to the production of media (e.g., optical discs or other physical data storage media) that are then provided to the end users via commercial channels.

The processing carried out by the data conversion facility 104 and the production facility 106 may be at the same physical location, or may be in different locations. It is contemplated, although not required, that in at least some situations these will be different parties, so that the original source data from the source media will not be directly available to the production facility 106. For example, the data conversion facility 104 may be a company that provides digital data services to convert archived data sets, such as old audio/video works, into a digital format. The production facility 106 may process the formatted data in preparation for distribution by the network 102.

The respective network 102, data conversion facility 104 and production facility 106 blocks are each shown to include one or more physical memory locations (mem) 102A, 104A and 106A. It will be appreciated that these memories represent computer-readable physical data storage memory devices used to store the various data sets during the respective operations of these blocks. The memories may take any variety of forms including volatile or non-volatile memory, RAM, flash, disc-based memory, cache memory, buffers, and so on. More than one physical device and/or type of physical device can form the respective memories 102A, 104A, 106A.

Figure 2:
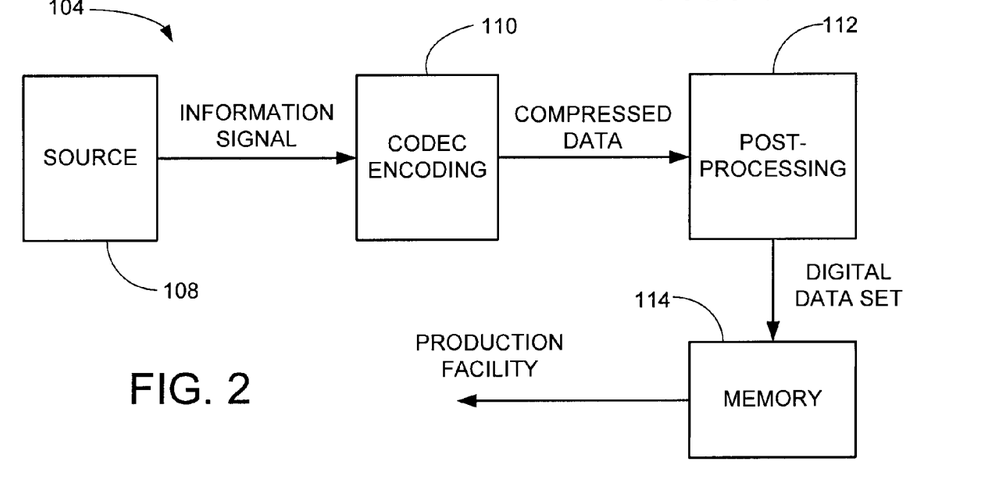
FIG. 2 represents operation of the data conversion facility of FIG. 1 in accordance with some embodiments.

FIG. 2 shows processing of the input source data that may be carried out by the data conversion facility 104 of FIG. 1. It will be appreciated that these various elements are exemplary and other system configurations can readily be employed as desired, depending on the requirements of a given application. One or more of the blocks shown in FIG. 2 can be combined into a single hardware, firmware and/or software based controller or other circuitry.

For purposes of the present discussion, it will be contemplated that the data being processed by the facility 104 in FIG. 2 constitutes video data (e.g., a video component of a movie or other visual work). This is merely illustrative and not limiting, as any number of different formats of pixelated data may be used as desired. It is further contemplated that the original video data set is stored on a magnetic medium, such as a video tape. This is also merely illustrative and not limiting, as any number of different types of source media can be used, including but not limited to magnetic discs, optical discs, solid state memory, and so on. Thus, while some embodiments are directed to an analog input signal, such is not necessarily required. For example, the source data may be initially stored in a first digital format and the information processing is applied to convert the data to a different, second digital format.

A source block 108, such as a videotape playback system, transduces an analog data storage medium to generate an information signal that is supplied to a codec encoding block 110. The codec encoding block 110 generates compressed data as a series of digitally encoded frames. The compressed data are processed by a post-processing block 112 to provide a final encoded digital data set. This post-processing may include the detection and correction of various codec-based artifacts induced in the data set by the codec encoding block 110. The data set may be temporarily stored in memory 114 for subsequent transmission to the production facility 106.

Figure 3:
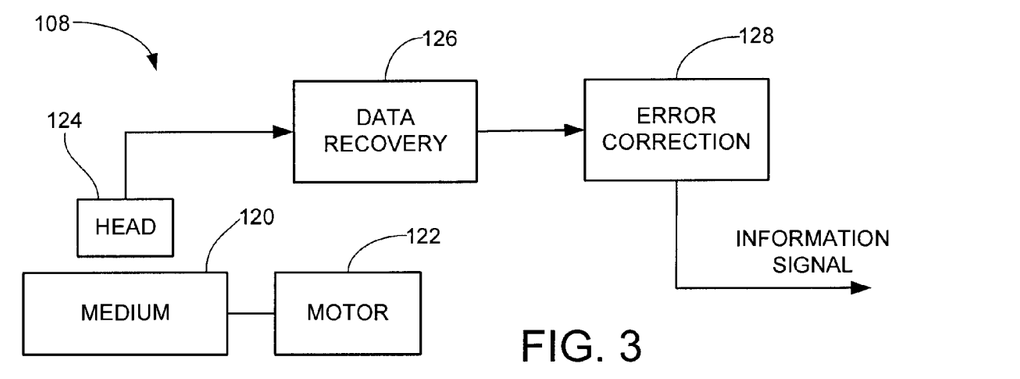
FIG. 3 depicts operation of the source block of FIG. 1 in accordance with some embodiments.

FIG. 3 is an exemplary representation of the source block 108 of FIG. 4 in accordance with some embodiments. Other forms may be employed. A magnetic storage medium (in this case, video tape) 120 is advanced via a motor 122 adjacent a data transducing head 124 (e.g., tape head) to transduce a readback signal therefrom. A data recovery readback channel 126 processes the readback signal. In some cases, an error correction block 128 may apply automated error correction to detected errors in the recovered signal (e.g., drop outs, pops, etc.).

Because of the analog nature of the exemplary source block 102 in FIG. 3, it is contemplated that information signals as described herein may from time to time include visually detectable source-based artifacts. Such artifacts may arise for a number of reasons. Defects associated with the medium (e.g., grown defects, age) may interfere with ability of the readback system to accurately replay the data. The readback head may demonstrate suboptimum performance and require cleaning or replacement, and this suboptimum performance may introduce source-based artifacts. Artifacts may arise due to noise introduced into the recovered signal, or by the operation of the error correction block.

It has been found that the automated error correction of blocks such as 128 can sometimes result in the generation of visually perceptible source-based artifacts in the baseband output video frame (e.g., the above identified information signal) as well as in any subsequently encoded digital file formed from the baseband signal. Such artifacts can include but are not limited to the following: block-based pixel arrays (most commonly 8×8 groups of pixels, but can vary in size, depending on the tape), where every other pixel in a block has been dropped out completely or has widely varying luma components from its neighbor, creating a mesh-like effect in a specific block; alternating high and low luma values in scan lines of a block; blocks or macroblocks held from a previous frame; blocks or macroblocks which become visible in the frame due to a lack of information to encode those blocks or macroblocks; and constant chroma or missing chroma with very high luma in a single pixel or small group of pixels that does not occur in more than one-half of the surrounding pixels. Other source-based artifacts may arise depending on the circumstances.

Some artifacts that exist on the original tape may be difficult to detect after the codec conversion process. Examples include macroblocking artifacts that exist in the original digital tape frame and align on the digital tape codec's macroblock boundaries, but due to a different codec used during the ingest process, the original artifacts do not line up on the new codec's macroblock boundaries.

Figure 4:
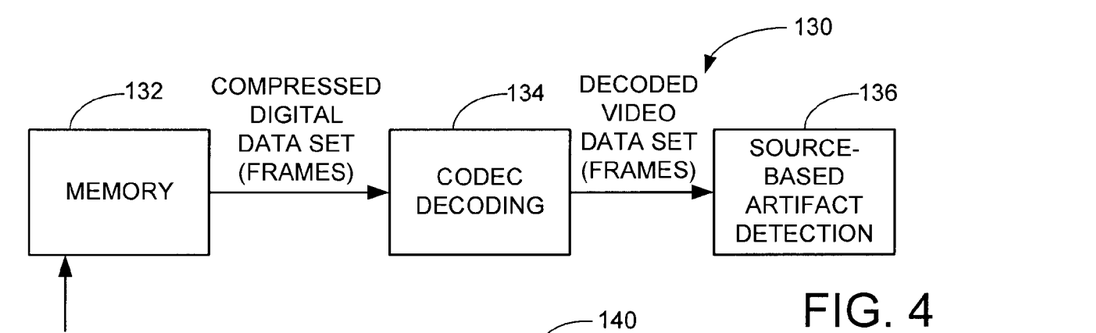
FIG. 4 represents operation of the production facility of FIG. 1 in accordance with some embodiments.

Accordingly, a source-based artifact detection system is provided such as shown at 130 in FIG. 4. The source-based artifact detection system 130 can be utilized by the production facility 106 (FIG. 1) to analyze input data supplied by the content provider 104. As explained below, the system 130 generally operates to detect source-based artifacts by decompressing the compressed video data set to provide a decoded video data set, and analyzing the decoded video data set to detect at least one source-based artifact responsive to a luminance value of at least one pixel in the decoded video data set. The at least one source-based artifact induced by the source prior to the compression encoding of the input video frame. The at least one source-based artifact is further detected independently of the input video frame; that is, without reference to (such as, e.g., in a frame-by-frame comparison with) the input video frame output by the source.

In accordance with at least some embodiments, the digital data set is temporarily stored in a suitable memory location 132. The data set is read out of the memory and decoded using a codec decoding block 134 to provide decoded baseband video frames. The decoded frames are analyzed by an artifact detection block 136 to detect the presence of source-based artifacts. The various elements in FIG. 4 can take a variety of forms, such as a hardware, firmware or software based controller.

Figure 5:
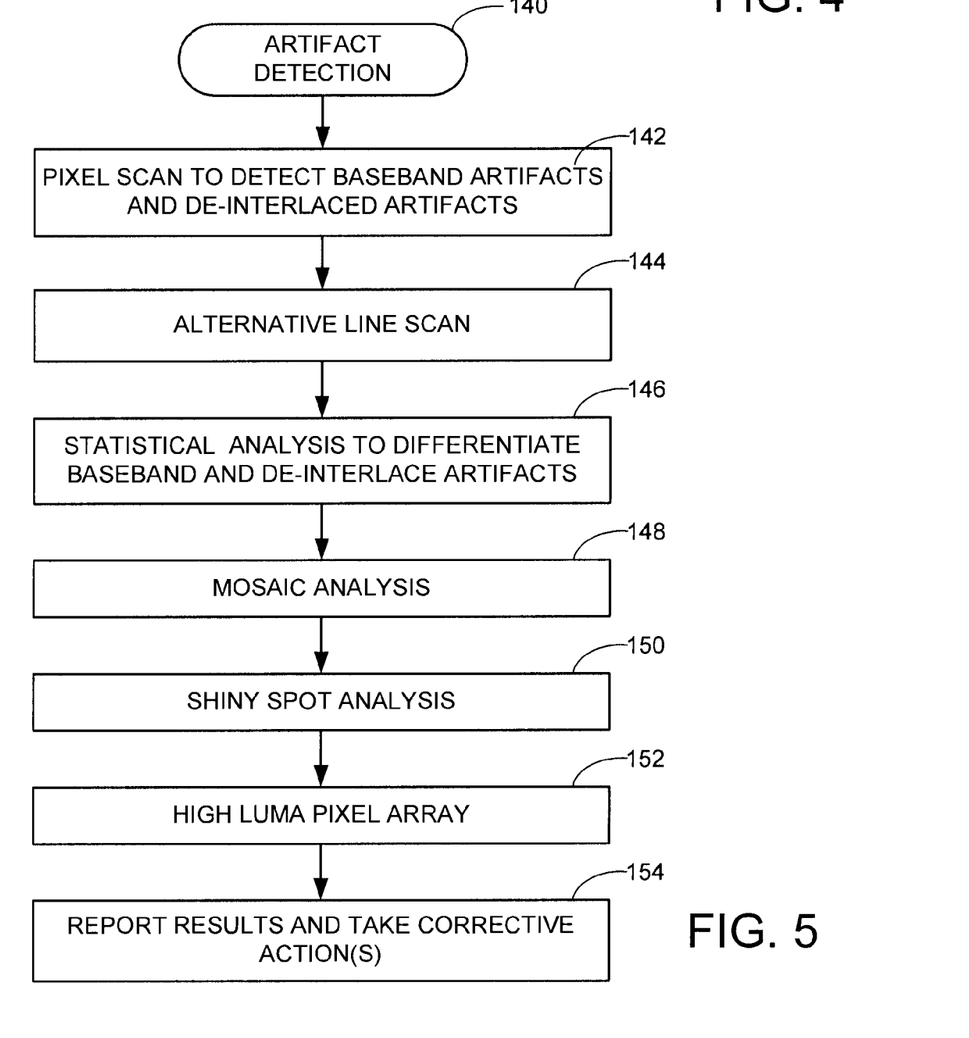
FIG. 5 is a flow chart for an ARTIFACT DETECTION routine carried out by the detection block of FIG. 4 in accordance with some embodiments.

FIG. 5 sets forth a flow chart for an ARTIFACT DETECTION routine 140 representative of exemplary steps that may be carried out in accordance with various embodiments by the artifact detection block 136 of FIG. 4. In the exemplary routine, a succession of high speed analysis steps is carried out on a frame-by-frame basis at a rate that is generally much higher than the normal display rate of the content.

In order to explain the routine 140 of FIG. 5, it may be helpful to provide further details concerning exemplary formatting of the data and the upstream processing that may be applied thereto prior to the operation of the routine. As will be appreciated, video data are often composed of frames (pictures) that are displayed in succession at a selected rate (e.g., 30 frames/second). Many codecs operate to build frames using a basic unit known as a pixel to describe a single point of video information in each frame.

A variety of pixel formats are known in the art. One exemplary format is sometimes referred to as the RGB model, which uses combinations of the respective additive primary colors red, green and blue to express each of a number of different colors. The color value for a particular pixel may be expressed as a sequence of three eight-bit digital values, one for each of the R, G and B components, for a total of 24 bits/pixel. This allows for the separate encoding of about 16.7 million ($2^{24}$) different colors. The RGB model has found widespread use in a variety of video display applications such as cathode ray tube (CRT), LCD and LED displays.

Another exemplary pixel format is sometimes referred to as the YUV (or YCbCr) model, which is often used in digital pipeline applications for the transmission of digital content. This model can allow for the ready conversion to and from the RGB model as required using a simple conversion function. Instead of expressing the color of a pixel directly in terms of R, G and B components, a typical YUV pixel generally has a Y component, referred to as the luminescence (luma or brightness) value, and two chrominance (chroma or color) U and V components expressed as color difference values.

As with the RGB model, the Y, U and V components in the YUV model may each be expressed as multi-bit values, such as three eight-bit values to provide a total of 24 bits/pixel. Other respective numbers of bits can be used as required. It is contemplated that the various embodiments discussed herein process pixels in accordance with the YUV model, although such is merely illustrative and not limiting.

Advantages of YUV processing include compatibility with black and white (monochrome) television formats, further data compression opportunities as some of the bits may be discarded in some cases without noticeable loss of video output clarity or color depth, and the fact that archived source data sets of the type exemplified herein are often originally recorded in a YUV format.

Codecs generally operate to construct a frame by grouping individual pixels into two-dimensional contiguous blocks of pixels. The blocks are arranged in turn into larger macroblocks, and the macroblocks are grouped in turn into the completed frame. These multiple groupings allow codecs to only describe the smallest unit that changes from one frame to the next. This is a common method for saving space, or compressing, the video data.

The layout of blocks and macroblocks may be performed on a grid within the frame, and the size of the blocks and macroblocks varies, depending on the codec used. A common codec-based artifact introduced during digital video compressing in macroblock-based video codecs is blockiness (here referred to as macroblocking artifacts), which can be caused by a lack of bits available in the frame from the encoder to properly encode the current block or macroblock without causing the edges of the block or macroblock to be visible to the human eye as a discontinuous color and/or brightness transition. Generally, macroblocking artifacts can cause the block and macroblock edges, which should normally be invisibly blending together, to become visible edges in the displayed picture.

During a source data input (ingest) process such as the exemplary video tape ingest process discussed above, the video tape recorder (VTR) initiates readback of the data stored on the video tape. An analog VTR will decode the analog magnetic response signal from the tape, and sends this signal directly to the output of the VTR. A digital VTR will decode the analog magnetic response signal from the tape, retrieve the digital bits from the analog signal, decode the digital bits according to the codec encoding scheme associated with the tape, and send this decoded signal to the output of the VTR.

The output of the VTR in either case may be characterized as a baseband video signal, which can be played back on any baseband video monitor compatible with the baseband standard being output. Exemplary baseband standards include NTSC, PAL, ATSC, DVB, ISDB and others.

VTRs tend to utilize magnetic head technology to read the source data from tapes, so regardless of whether the video signal is analog or digitally encoded on the tape, a magnetic read process will be used to retrieve the source data. An event which causes the radio frequency (RF) levels to drop between the magnetic read head and the tape will likely cause a drop out of signal for the particular video frame being read at that point. Many VTRs, particularly digital VTRs, have built-in error correction to help compensate for low RF events, and in some cases, the digital codecs used on the tape will define an error correction method. Accordingly, a VTR may attempt to automatically correct a low RF event by applying some form of error correction to the video frame in order to avoid a complete loss of the frame. The VTR output is received by a file-based media encoder, which encodes the baseband signal using a user-specified codec to create the digital file.

In some cases, the automated error correction of the source VTR may result in a visually perceptible artifact being introduced in the video frame on output (and subsequently encoded into the digital file). These error correction-based artifacts may include block-based pixel arrays, which may be arranged as M×N groups of pixels (such as 8×8 groups of pixels, but can vary in size depending on the tape), where every other pixel in the array has been dropped out completely or has widely varying luma components from neighboring pixels. This can tend to create a mesh-like effect in a specific block.

Other artifacts from source based error correction may include pixels having alternating high and low luma values in scan lines of a block, blocks or macroblocks that are held (carried over) from a previous frame, blocks or macroblocks which become visible in the frame due to a lack of information to encode those blocks or macroblocks, and pixels with constant chroma or missing chroma values with very high luma values in a single pixel, or small group of pixels, that does not occur in more than one-half of the surrounding pixels. Other types of source based error correction artifacts may arise so this list is merely exemplary and is not limiting.

Other source-based artifacts may be introduced due to defects or other anomalies on the original tape (or other source medium). Such medium-based artifacts may be relatively difficult to identify after the ingest process, and can include macroblocking artifacts that exist in the original digital tape frame and align on the digital tape codec macroblock boundaries, but due to a different codec used during the ingest process, the original artifacts do not line up on the new codec macroblock boundaries. Other types of medium-based artifacts can similarly be introduced.

The routine 140 of FIG. 5 accordingly provides a number of analysis steps adapted to detect these and other source-based artifacts, and to distinguish the source-based artifacts from codec-based artifacts that are introduced via the operation of the codec processing block during the upstream source data ingest process. As shown in FIG. 5, the routine includes a pixel scan 142, an alternative line scan 144, a statistical count analysis 146, a mosaic analysis 148, a shiny spot analysis 150, and a high luma pixel array analysis 152

Each of these steps will be discussed in turn, but at this point it will be noted that once these various steps have been taken, the process may continue at step 154 where results are reported and correction action(s) are taken as appropriate. It will be appreciated that additional steps can be carried out as desired, so that these are merely exemplary and not limiting. The various steps can be performed in a different order than that shown, and one or more of the steps shown in FIG. 5 may be omitted entirely.

The disruption patterns induced by source-based defects can occur on a pixel, block or macroblock basis, and the block and macroblock edges will no longer likely be aligned to the encoded file block and macroblock edge boundaries from the upstream codec processing. The pixel scan step 142 thus generally performs a pixel by pixel scan that generally includes scanning each pixel line in the picture to first look for widely varying luma values in every other pixel, scanning small blocks of pixels to detect visible edges at block boundaries, and scanning pixels from one frame to the next to detect large localized changes in brightness.

In some embodiments, the pixel scan of step 142 begins with the scanning of each pixel line (row) in each frame to detect widely varying luma values between adjacent pairs of pixels. In one exemplary embodiment, a threshold value is established such that a difference exceeding a threshold of T1=80 on an 8-bit luma scale (out of a maximum value of 256) is flagged as a possible artifact. While this scan can be performed in a variety of ways, in some embodiments this is carried out by, for each pixel along the line in turn, calculating the difference between the luma value of the existing pixel in the line to the luma value of the immediately successive pixel in the line. A difference that exceeds T1 is flagged. A record may be noted in memory of the location of each flagged pixel.

Figure 6:
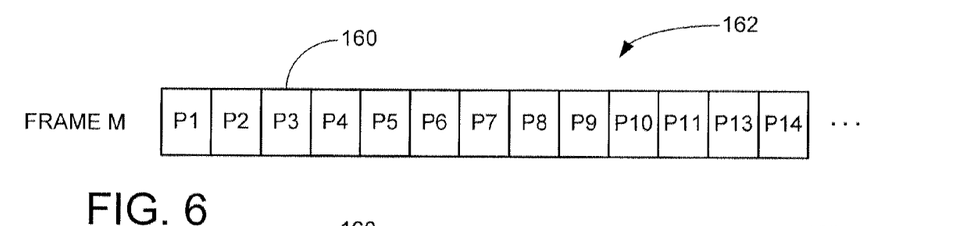
FIG. 6 illustrates an exemplary pixel line from a selected frame of data that may be analyzed by the routine of FIG. 5.

By way of illustration, FIG. 6 represents a sequence of pixels 160 along a selected pixel line 162 in a selected frame (designated Frame M). The pixels 160 shown in FIG. 6 are arbitrarily denoted P1-P14. In some embodiments, the luma value for each selected pixel in turn, such as pixel P3, is subtracted from the luma value of the immediately following pixel, such as pixel P4. If the difference exceeds the selected threshold T1, pixel P3 (or P4) may be flagged. In further embodiments, only every pair of pixels is compared (e.g., P1/P2, P3/P4, etc.). In still further embodiments, a flagged pixel may be compared to both of its neighbors to determine whether the pixel is a single pixel variation or if it represents a boundary to multiple pixels.

Additional scanning during step 142 can involve scanning each pixel line in each frame to determine if a group of X pixels (such as a group of 8 or 16 pixels in the line) creates a visible edge at the pixel group boundary. This can be carried out in a variety of ways, including by examining the respective luma values at each boundary of pixels along the selected line. Significant changes in the luma values and/or significant changes in the chroma values can be used to detect these boundaries. With reference to FIG. 6, this scanning can involve groups of eight pixels (such as P1-P8, P9-P16, etc.) so that the difference in values between P8-P9 (and P16-P17, etc.) is determined. A suitable threshold value T2 can be used. T2 may be the same as T1, or may be a different suitable value. As noted above, the boundaries during this scan may be selected to be different from the normal codec boundaries used to digitize the data after the VTR output, so other boundary detection methodologies can be used, such as those used to detect codec-induced boundaries. As before, exceptions may be flagged in a record list in memory.

Figure 7:
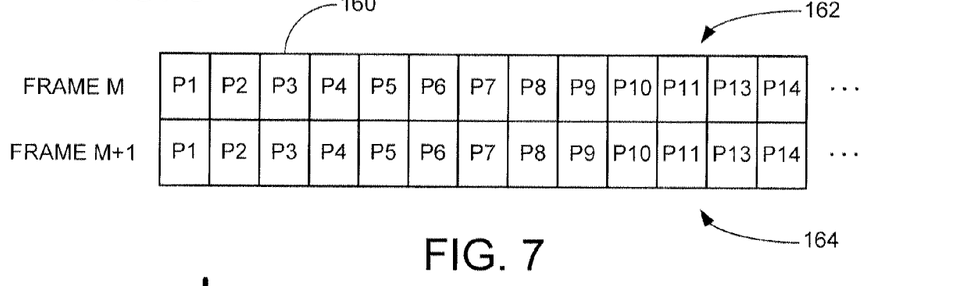
FIG. 7 shows two pixel lines for different frames of data that may be analyzed by the routine of FIG. 5.

Further scanning of each pixel line can be carried out during step 142 to compare each pixel line to the corresponding pixel line in the immediately successive frame to detect pixels that exhibit constant or missing chroma frame to frame, in combination with relatively high luma values, such as exceeding a selected threshold (e.g, a threshold of T3=220 on an 8-bit luma scale). This is generally represented by FIG. 7, which illustrates two respective pixel lines 162, 164 for immediately successive Frames M and M+1. It will be appreciated that the two pixel lines 162, 164 are in the same location on the respective Frames M and M+1. In this phase of the pixel scan analysis step, the chroma and luma values for each selected pixel, such as P3, is compared between the respective scan lines 162, 164 as noted above. This localized increase in brightness from one frame to the next may indicate a source based defect.

In some embodiments, the pixel scan processing of step 142 in FIG. 5 can be followed by an alternative lines analysis of step 144. The alternative lines analysis is helpful in distinguishing between source-based defects and interleave errors (e.g., where blocks of pixels have been placed "out of order" in the resulting frame). The above analyses can be performed separately prior to the alternative lines analysis, or the alternative lines analysis can be configured to include the above analyses.

Figure 8:
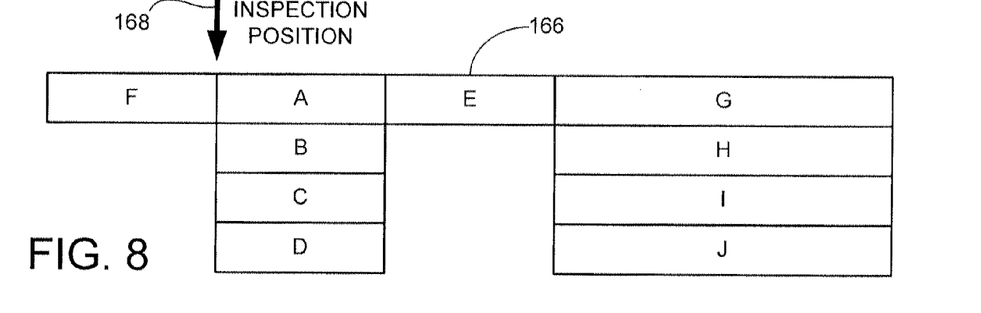
FIG. 8 depicts groups of pixels that may be analyzed by the routine of FIG. 5

FIG. 8 shows a representation of groups 166 of pixels 160 in a selected frame (Frame N). The groups are denoted as Groups A-J and represent rolling "windows" of pixels during the scan. A current inspection point is denoted by arrow 168 and corresponds to the first pixel in Group A.

The sizes of the respective groups 160 can vary. In some embodiments, each block is one pixel high. Blocks A-F are each provided with a selected block length (P) and Blocks G-J have a selected block length Q that is twice P (Q=2P). The respective lengths of the blocks can vary and may be selected in relation to the resolution size of the frame. For purposes of illustration, the length P may be set to eight pixels (P=8) for an image size of 720×480 (720 pixels per scan line by 480 scan lines, e.g., 720 columns and 480 rows); a length P of twelve pixels (P=12) for an image size of 1280×10$^{24}$; and a length P of sixteen pixels (P=16) for an image size of 1920×1080.

In this model, a scan can be performed from the very beginning of a frame one pixel by one pixel to the last pixel of the frame. As desired, a small number of pixels, such as 2-3 pixels, can be skipped if it is found that the pattern is extremely too far away from the intended pattern. Once a defect is found that appears to be related to the transducing head, an interval corresponding to the physical width of the head can be skipped.

The statistical analysis step 146 of FIG. 5 can be performed on statistics accumulated during step 144. In some embodiments, luma values are evaluated in accordance with the various relations in Table 1 for each inspection point as represented in FIG. 8. It will be appreciated that other functions may be used as desired so these relations are merely exemplary and not limiting.

TABLE 1

Mean(A) − Mean(B) > T1
ArrayDif(A,B, Bar_Width) > T2
Mean(C) − Mean(D) > T3
ArrayDif(A,C, Bar_Width) < T4
ArrayDif(B,D, Bar_Width) < T5

In Table 1, the mean function represents the mean, or average, of the associated pixels in the associated groups. For example, Mean(A) is the average luma value for the pixels in group A, and so on. ArrayDif is the average absolute value of the difference between the mean values of two associated groups (arrays). Bar_Width is the length of the associated group. T1 through T5 are appropriate thresholds selected out of the total range of values for the associated luma values (e.g., 0 to 255 for eight bit luma values, etc.).

The thresholds may be empirically determined. In some embodiments, the empirical analysis used to identify suitable threshold values may include using a test video with known source-based defects provided therein, and repeating the various computations set forth herein while adjusting the threshold values until the known defects in the source data are consistently identified.

Additional calculations during the statistical analysis of step 144 can be performed in accordance with Table 2. These additional calculations can be used to evaluate whether de-interleave errors (out of order segments of pixels) are in the frame. In some embodiments, the evaluation of Table 2 may be performed only if one or more exceptions are noted after the operation of Table 1. As before, other relations may be used as desired so these are merely exemplary and not limiting.

TABLE 2

Mean(G) − Mean(H) > T6
ArrayDif(G,H, 2*Bar_Width) > T7
Mean(I) − Mean(J) > T8
ArrayDif(G,I, 2*Bar_Width) < T9
ArrayDif(H,J, 2*Bar_Width) < T10
Mean(B) − Mean(H) < T11

The Mean and ArrayDif functions are performed as discussed above. As before, suitable threshold values T6-T11 may be empirically determined.

If the relations of Table 2 are satisfied, then variances for groups A, B, G and I are next identified (Var(A), Var(B), Var(G) and Var(I)). The variance values represent the variations of luma values for the pixels in each of the respective groups. The variance values are next evaluated such as set forth by Table 3:

TABLE 3 min(Var(G), Var(I)) < T11
max(Var(A), Var(B)) < T12

The min function is the minimum variation between the respective variance values for the associated groups. Similarly, the max function is the maximum variation between the respective variance values for the associated groups. T11 and T12 are suitable thresholds established via empirical analysis. In some embodiments, suitable values for T11 and T12 may be T11=21 and T12=31. If both relations from Table 3 are satisfied, then the error can be characterized as a de-interlace artifact.

Figure 9:
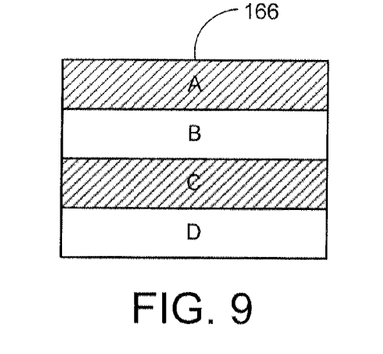
FIG. 9 depicts groups of pixels that may be analyzed by the routine of FIG. 5.

FIG. 9 represents the presence of such a de-interlace artifact. It is contemplated that the above processing indicates that groups A, B, C and D are out of order, as group C should be adjacent group A and group D should be adjacent group B. It will be appreciated that other analysis steps can be carried out to detect de-interleave artifacts so the processing in accordance with Table 3 is merely exemplary and not limiting.

Returning to the processing of Table 2, if one or more exceptions are noted after the operation of the constraints in Table 2, then further analyses may take place as a finer inspection to reduce false positives. Normally, it may be expected that the variance of groups A-D may be relatively small, and the variance of A (Var(A)) should be the local minimum across the pixels along group A. That is, shifting the window of pixels defined as group A left or right along the associated scan line a selected number of pixels should result in an increase in Var(A).

Figure 10:
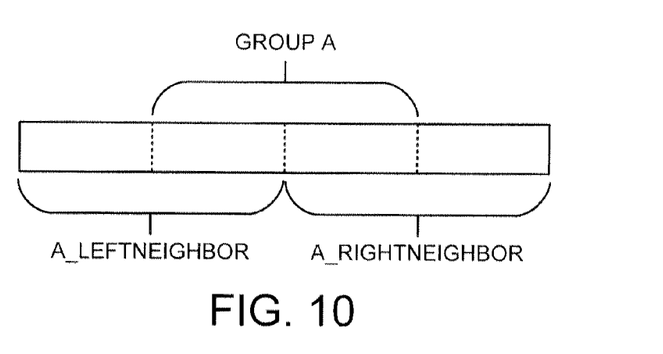
FIG. 10 illustrates different groupings of overlapping pixels along a selected scan line that may be analyzed by the routine of FIG. 5.

Two new groups of pixels can be defined by shifting group A to the left and to the right by one-half the Bar_Width value: A_LeftNeighbor and A_RightNeighbor, as generally represented in FIG. 10. A third group of pixels (not separately shown in FIG. 10) can further be defined by shifting the group to the right by one pixel. This third group of pixels may be defined as A_OneRight.

The finer inspection analyses can be carried out in accordance with the relations in Table 4:

TABLE 4

Mean(A) − Mean(E) > T13
Mean(A) − Mean(F) > T14
Current_Var=min(Var(A),Var(C)) < T15
max(Var(A_LeftNeighbor),Var(A_RightNeighbor)) − Current_Var > T16
Var(A_OneRight) > Current_Var If the above constraints are not met, then the source-based artifact noted during the operation of Table 2 is confirmed. If Table 4 shows no exceptions, then the artifact noted after the operation of Table 2 is determined to be a false positive and is removed from the exception list as a flagged artifact.

In some embodiments, after a full search and analysis of all pixel positions in the frame in accordance with the foregoing discussion, the statistical processing of step 144 will arrive at respective accumulated numbers N1 and N2 of source-based artifacts and de-interlace artifacts, respectively. These values may be subjected to analysis such as set forth by Table 5:

TABLE 5

If N1>=3 or N1>=2&&N2 ==0 then there are
source-based artifacts in this frame
If N1 <35 && N2 >= 20 then there are
de-interlace artifacts in this frame As to the first relation, if either condition is satisfied then the presence of source-based artifacts on the frame is confirmed. As to the second relation, if both relations are satisfied then the presence of de-interlace artifacts on the frame is confirmed. Other respective parameters can be set as desired based on empirical analysis.

All of the above analyses can be performed on every pixel in each frame, or on a subset of the pixels in each frame. To accelerate the calculation processing, if one constraint fails during inspection, further inspection at that point can be terminated and a new inspection position can be selected, such as by advancing a selected number of pixels along the associated scan line (e.g., moving 1-2 pixels to the right, etc.). As desired, the detected presence of de-interleaved errors can be immediately corrected at this point prior to further processing.

As noted above, the processing discussed thus far can be used in some embodiments as a final indicator of the presence and location of source-based artifacts in the analyzed codec-processed data. Further analyses can be performed, however, such as by the mosaic analysis of step 148 in FIG. 5.

Figure 11:
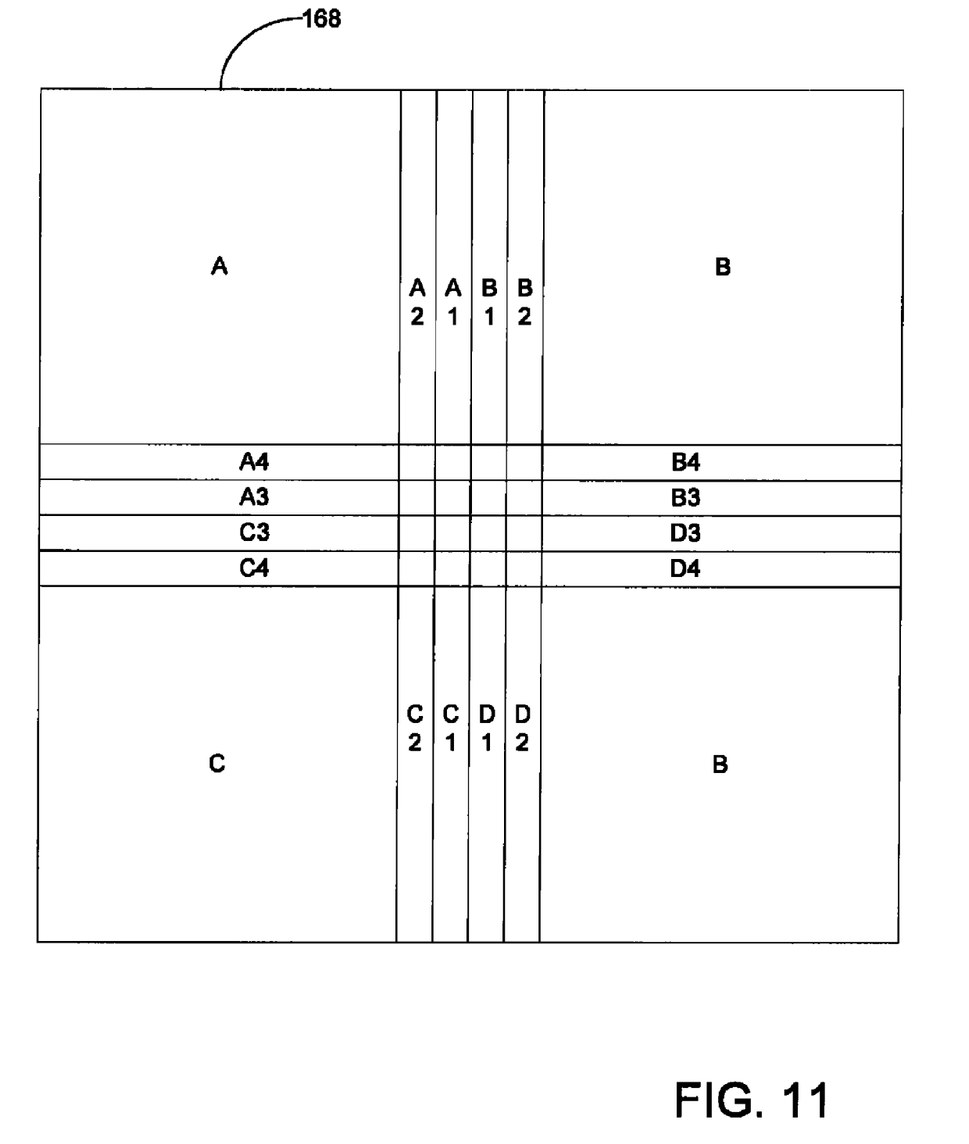
FIG. 11 shows a mosaic pattern of that may be analyzed by the routine of FIG. 5

The mosaic analysis can be carried out by defining a mosaic pattern such as depicted in FIG. 11. It will be appreciated that other mosaic patterns can be defined as desired. Generally, the mosaic analysis is carried out on a column-by-column basis in addition to the general row-by-row analysis of steps 142, 144, and is further carried out on blocks of pixels over multiple scan lines rather than on groups of pixels along respective scan lines.

Four blocks 168 of pixels may be selected from within each frame. These blocks 168 are denoted as blocks A-D and will generally be all the same size. The blocks 168 can be selected to correspond to any appropriate block sizes, such as the size of blocks used by the source device prior to the operation of the codec. As mentioned above, 8×8 and 16×16 blocks may be used, or other sizes may be selected.

Some of the individual rows and columns of pixels in the respective blocks A-D are denoted as a1-a4, b1-b4, c1-c4 and d1-d4 in FIG. 11. The processing discussed above during the statistical analysis of the pixel scan results can be performed on these arrangements of pixels as well. For example, the alternative line scanning relations of Tables 1-2 can be applied to detect source-based artifacts, as before. Of particular interest is the fact that there should be clear distinctions between the respective boundaries between the pixels of a1 and b1, c1 and d1, b3 and d3, and a3 and c3.

As before, the mosaic analysis can be carried out by successively evaluating blocks that cover all, or only a portion of, the associated frame. In some embodiments, the mosaic analysis is applied in relation to the foregoing steps; for example, frames that exhibit source-based artifacts may be either skipped, or specifically analyzed, using the mosaic analysis. Moreover, the mosaic analysis may be limited to areas exhibiting particular artifacts noted by the foregoing steps.

Figure 12:
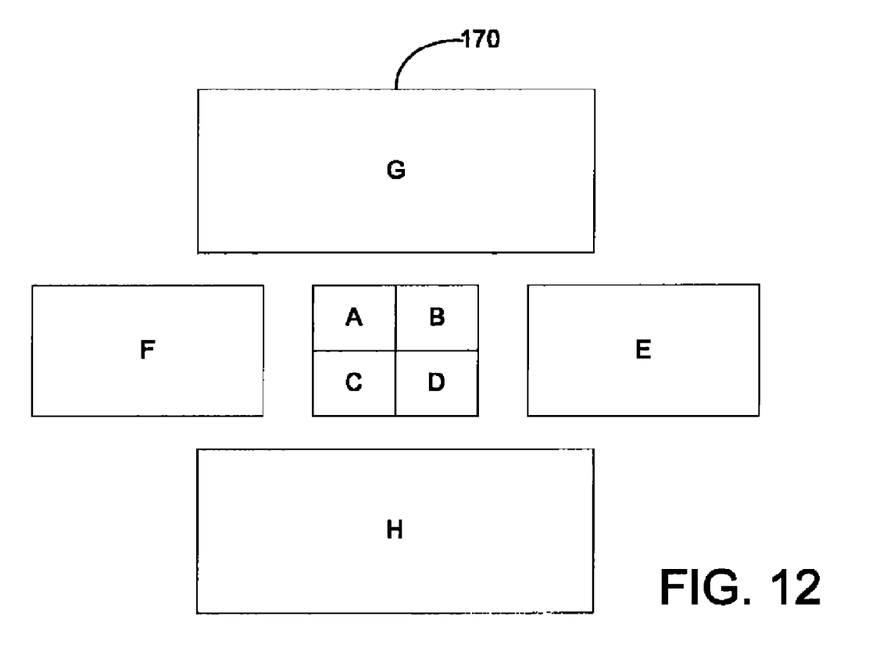
FIG. 12 provides further groups of pixels that may be analyzed by the routine of FIG. 5.

The shiny spot analysis of step 150 in FIG. 5 will next be discussed with reference to FIG. 12. The shiny spot analysis generally operates on the recognition that luma values of pixels in areas of relative high brightness ("shiny spots" in the video frame) can be significantly greater than the luma values of pixels surrounding the shiny spot. Accordingly, a portion of a selected frame can be divided up into adjacent blocks 170 denoted as blocks A-H. Each of the blocks 170 can take any suitable size, so the respective aspect ratios represented in FIG. 12 may not necessarily be to scale.

It is contemplated that the respective blocks will be immediately adjacent (e.g., block H will be immediately below and contiguous with at least portions of F and E as well as blocks C and D, etc.). However, such is not necessarily required since the analysis is examining the localized intensity in the vicinity of blocks A-D in relation to the neighboring blocks E-H, and so the presence of other pixels between the respective blocks A-D and E-H may not have a significant effect on the analysis results.

In accordance with some embodiments, a search is performed of pixels within the respective blocks that meet the following constraints set forth in Table 6:

TABLE 6

Max(A,B,C,D) − Mean(E) > T1
Max(A,B,C,D) − Mean(F) > T2
Max(A,B,C,D) − Mean(G) > T3
Max(A,B,C,D) − Mean(H) > T4

In Table 6, the Max function represents the maximum luma value for pixels from blocks A, B, C or D, and the Mean function is the average of the luma values of the pixels in the respective blocks E, F, G and H. The respective thresholds T1-T4 are set to appropriate values, and may be the same value. As before, empirical analysis can be used to set the threshold values. Exceptions from the relations in Table 6 are flagged in memory.

Figure 13:
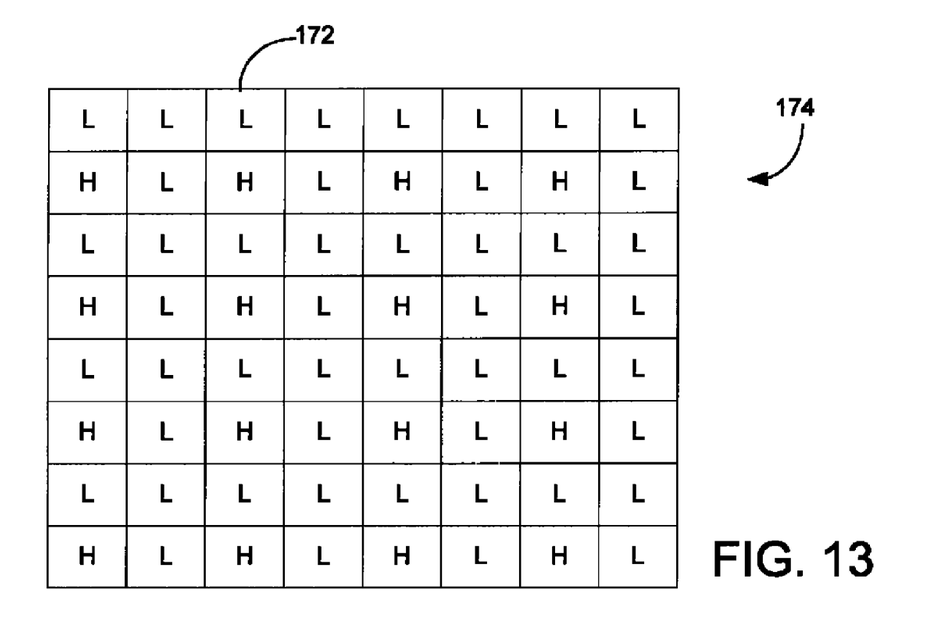
FIG. 13 provides an array of pixels that may be indicative of a source-based defect in accordance with some embodiments.

Continuing with the routine of FIG. 5, the high luma pixel array analysis of step 152 will now be discussed. A high luma pixel array is a type of source-based artifact such as represented by FIG. 13. Individual pixels are noted at 172 and are designated by respective letters (L) and (H). The H designations indicate a relatively high luma value, and the L designations indicate a relatively lower luma value. The respective L and H pixels may be arranged into an N×N array 174 (in this case an 8×8 array), such as in the manner shown. The pixels with the H designation may all have different luma values, but all of these higher luma values will tend to exceed a predetermined threshold. Similarly, the pixels with the L designation may tend to have different luma values, and all will tend to be below this threshold.

The artifact of the type represented by FIG. 13 may result from the higher luma (H) pixels blending with the lower luma (L) pixels, such as in 4:2:2 to 4:2:0 colorimetry conversions. The analysis of step 152 can operate to sort the lighter pixels by taking the average luma value of a four pixel sample, and approximating the location of the lighter pixel using these averages.

Detection of such artifacts can be carried out by dividing each frame into N×N arrays, and for each array, examining the respective luma values of the pixels to determine the number of high luma pixels corresponding to the respective locations of the exemplary array of FIG. 13, and the number of lower luma "background" pixels corresponding to the respective locations in the exemplary array. This can be carried out by sorting using a simple threshold value (e.g., 220 on a 256 range scale, etc.).

For each white pixel found to be "in position," localized analysis can be carried out on the four neighboring pixels (left, right, above, below in the array) by analyzing the luma values of these neighboring pixels. The variation in luma values in these neighboring pixels should be small, and the average luma value of these neighboring pixels should be significantly less than the luma value of the high luma (H) pixel. Satisfying these constraints will tend to indicate the presence of an alternating array source-based artifact.

The foregoing analysis steps 142-152 of FIG. 5 can be carried out for each frame of video in turn at relatively high speed. The number, types and locations of artifacts on each frame can be stored in memory. At the conclusion of the analysis, various corrective actions can be taken as represented by step 154.

In some embodiments, the identification of source-based defects can result in a request to the data conversion facility 104 (FIG. 1) to re-run and re-encode the source data. To the extent that the types of source-based artifacts can be identified (e.g., a tape head error, etc.), suggested corrective actions may be provided to the data conversion facility as well. An entire run of the input data may be supplied back to the production facility 106, or just updated frames for those flagged for exceptions may be provided.

In some embodiments, the routine may further identify codec-based artifacts and these may be corrected using existing codec-induced artifact correction techniques. In further embodiments, specific data "tweaking" efforts may be implemented to "fix" the source based artifacts without obtaining new data from the source medium.

It will now be appreciated that the various embodiments disclosed herein can provide benefits over the prior art. It will now be appreciated that the various embodiments disclosed herein may provide benefits over existing techniques. At present it is generally known to be able to detect and correct digital artifacts based on codec processing but not to address artifacts in the initial input data prior to the codec processing. The embodiments disclosed herein can thus operate in conjunction with more traditional digital artifact detection and correction methods. The various embodiments can be performed without the need to obtain access to the original unencoded data set and/or to perform a time consuming complex frame-by-frame comparison at readback speed.

While various embodiments are directed to broadcast distribution networks, such is merely exemplary and not limiting, as the disclosed subject matter has a wide variety of applications in different data handling environments.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A method for detecting source-based artifacts in a data set, comprising:
   receiving a compressed digital data frame, the digital data frame generated by an application of compression encoding to an input video frame output by a source device which reads a baseband video data set from a video tape;
   applying compression decoding to the digital data frame to provide a decoded video frame in a memory; and
   detecting at least one source-based artifact in the decoded video frame responsive to a luminance value of at least one pixel in the decoded video frame, the at least one source-based artifact induced by the source prior to said compression encoding of the input video frame and detected independently of the input video frame, the source-based artifact comprising an error experienced during the operation of the source device in reading the baseband video data set from the video tape.

2. The method of claim 1, in which the at least one source-based artifact of the detecting step is detected responsive to a luminance value of a first pixel in the decoded video frame and a luminance value of a second pixel in the decoded video frame.

3. The method of claim 2, in which the at least one source-based artifact is detected responsive to an average luminance value of a group of adjacent pixels in the decoded video frame.

4. The method of claim 1, in which the decoded video frame is arranged as an array of pixels in a plurality of horizontally extending scan lines, each pixel having an associated YUV multi-bit value to provide luminance and chrominance levels for said pixel, and the at least one source-based artifact is detected responsive to variations of the YUV values for pixels on different scan lines within the decoded video frame.

5. The method of claim 1, in which the compression encoding of the generating step comprises applying a selected codec algorithm to the input video frame to form the digital data frame.

6. The method of claim 5, in which the selected codec algorithm provides blocks of pixels in the digital data file having a first set of block boundaries between adjacent blocks, and the detecting step comprises analyzing blocks of pixels in the decoded video frame having a different, second set of block boundaries selected to not align with the first set of block boundaries.

7. The method of claim 1, further comprising further detecting at least one codec-based artifact in the decoded video frame, the at least one codec-based artifact induced by the compression encoding of the generating step, said compression encoding comprising application of a selected codec algorithm to the input video frame.

8. The method of claim 1, in which the at least one source-based artifact is detected responsive to a pixel-by-pixel scan of luminance values associated with a plurality of pixels in the decoded video frame.

9. The method of claim 1, in which the source device comprises a video tape playback device and the input video frame comprises a video signal generated by the operation of a transducer of the video tape playback device as the video tape is advanced adjacent the transducer.

10. The method of claim 9, in which the at least one source-based artifact corresponds to a grown defect on the video tape.

11. The method of claim 9, in which the at least one source-based artifact corresponds to a drop in radio frequency (RF) response of the transducer during playback.

12. The method of claim 9, in which the at least one source-based artifact corresponds to operation of an error correction circuit of the video tape playback device.

13. The method of claim 1, further comprising prior steps of using the source device to generate the input video frame, applying a codec algorithm to the input video frame to generate the compressed digital data frame, and transmitting the digital data frame to a remote location.

14. A method for evaluating a compressed video data set for source-based artifacts, the compressed video data set formed by outputting a baseband video data set from a source device and applying a codec algorithm thereto to generate the compressed video data set, the method comprising:

decompressing the compressed video data set to provide a decoded video data set nominally identical to the baseback video data set used to form the compressed video data set, the decoded video data set stored in a memory as a sequence of frames formed from individual pixels arranged into rows and columns; and identifying a source-based artifact in the decoded video data set induced by the source device prior to said application of the codec algorithm, the artifact identified responsive to a luminance value of at least one pixel in the decoded video data set and without reference to the baseband video data set, wherein the source device comprises a video tape playback device, and the source-based artifact comprises an error experienced during the operation of the video tape playback device in reading the baseband video data set from a video tape.

15. The method of claim 14, in which the source-based artifact is induced by operation of an error correction block of the source device in generating the baseband video data set.

16. The method of claim 14, in which the source-based artifact corresponds to a drop in radio frequency (RF) response of a transducer of the source device during playback of the video tape.

17. The method of claim 14, in which the identifying step comprises comparing a luminance value for a first pixel at a selected coordinate of a first frame to a luminance value for a second pixel at said selected coordinate of a second frame immediately following the first frame.

18. The method of claim 14, in which the source-based artifact is detected responsive to an average luminance value of a first group of adjacent pixels in a selected frame of the decoded video data set and responsive to an average luminance value of a second group of adjacent pixels in the selected frame.

19. The method of claim 14, in which each pixel has an associated YUV multi-bit value to provide luminance and chrominance levels for said pixel, and the source-based artifact is detected responsive to variations of the YUV values for pixels on different scan lines within a selected frame of the decoded video data set.

20. The method of claim 14, in which the codec algorithm used to generate the compressed video data provides blocks of pixels in the digital data file having a first set of block boundaries between adjacent blocks, and the detecting step comprises analyzing blocks of pixels in the decoded video frame having a different, second set of block boundaries selected to not align with the first set of block boundaries.

21. An apparatus for identifying source-based artifacts in a compressed video data set formed by outputting a baseband video data set from a source device and applying a codec algorithm thereto to generate the compressed video data set, the apparatus comprising:

a memory which stores the compressed video data set;

a decoding block coupled to the memory which decompresses the compressed video data set to provide a decoded video data set nominally identical to the baseband video data set used to form the compressed video data set; and an artifact detection engine which identifies a source-based artifact in the decoded video data induced by the source device prior to said application of the codec algorithm without reference to the baseband video data set, the source-based artifact detected responsive to a luminance value of at least one pixel in the decoded video data set, the source-based artifact corresponding to at least a selected one of a grown defect on a data storage medium of the source device, a drop in radio frequency (RF) response of a transducer of the source device during playback of the medium, or operation of an error correction circuit of the source device.

22. The apparatus of claim 21, in which the artifact detection engine identifies the source-based artifact responsive to variations in luminance values associated with different pixels in a selected frame of the decoded video data set.

23. The apparatus of claim 21, in which the artifact detection engine successively examines groups of pixels in each frame of the decoded video data set and identifies the source-based artifact in relation to variations in luminance values of said pixels in said groups.

24. The apparatus of claim 23, in which at least one group of pixels is limited to a subset of pixels along a first scan line of a selected frame, and in which at least another group of pixels is limited to a subset of pixels along a different, second scan line.

25. The apparatus of claim 21, in which the decoded video data set is arranged as a sequence of frames, each frame comprising an array of pixels arranged into rows and columns and each having an associated YUV multi-bit value to provide luminance and chrominance levels for said pixel, and the artifact detection engine detects the source-based artifact responsive to variations of the YUV values for pixels on different scan lines within a selected frame of the decoded video data set.

* * * * *

UNITED STATES PATENT AND TRADEMARK OFFICE
CERTIFICATE OF CORRECTION

PATENT NO.         : 8,244,061 B1                          Page 1 of 1
APPLICATION NO.    : 13/309988
DATED              : August 14, 2012
INVENTOR(S)        : Eric M. Carson and Xinjie Yu It is certified that error appears in the above-identified patent and that said Letters Patent is hereby corrected as shown below:

In Col. 9, line 5
replace "size of $1280 \times 10^{24}$;"
with "size of $1280 \times 1024$;"

Signed and Sealed this
Thirteenth Day of November, 2012

David J. Kappos
*Director of the United States Patent and Trademark Office*